United States Patent [19]

Nohzuka

[11] 4,189,055

[45] Feb. 19, 1980

[54] FIXTURE FOR AN ELONGATED FLEXIBLE MEMBER

[76] Inventor: Hiromichi Nohzuka, 4-5-20-305, Shakujiidai, Nerimaku, Tokyo, Japan

[21] Appl. No.: 882,746

[22] Filed: Mar. 2, 1978

[51] Int. Cl.² .................... D06F 53/00; F16G 11/00
[52] U.S. Cl. .................... 211/119.12; 211/119.13; 24/139.1; 24/129 C; 223/91
[58] Field of Search ............ 24/139.1, 137 R, 131 C, 24/129 C, 129 B, 131 R; 211/119.12, 119.13, 119.1

[56] References Cited

U.S. PATENT DOCUMENTS

| 356,116 | 1/1887 | Garfield | 24/129 B |
|---|---|---|---|
| 483,825 | 10/1892 | Allen | 24/139.1 |
| 494,414 | 3/1893 | Crump | 24/139.1 |
| 556,555 | 3/1896 | Prosser | 24/139.1 |
| 750,782 | 1/1904 | Ramsey | 24/131 C |
| 1,044,805 | 11/1912 | Normand | 24/137 R |
| 1,054,107 | 2/1913 | Galbraith | 24/131 R |
| 1,147,305 | 7/1915 | Butterfield | 24/139.1 |
| 1,899,982 | 3/1933 | Olson | 24/137 R |
| 2,600,091 | 6/1952 | Becker | 24/137 R |
| 3,678,543 | 7/1972 | Hobbs | 24/129 B |
| 3,714,923 | 2/1973 | Mariani | 24/129 B |

FOREIGN PATENT DOCUMENTS

| 725458 | 5/1932 | France | 24/137 R |
|---|---|---|---|
| 989859 | 9/1951 | France | 24/131 C |

*Primary Examiner*—Bernard A. Gelak
*Attorney, Agent, or Firm*—Oblon, Fisher, Spivak, McClelland & Maier

[57] ABSTRACT

A fixture for a string, a band or the like, comprising at least two spaced vertical fixing portions and a horizontal connecting portion extending between the vertical fixing portions. The material, such as a string or a band, is helically wound or coiled round the horizontal connecting portion.

4 Claims, 6 Drawing Figures

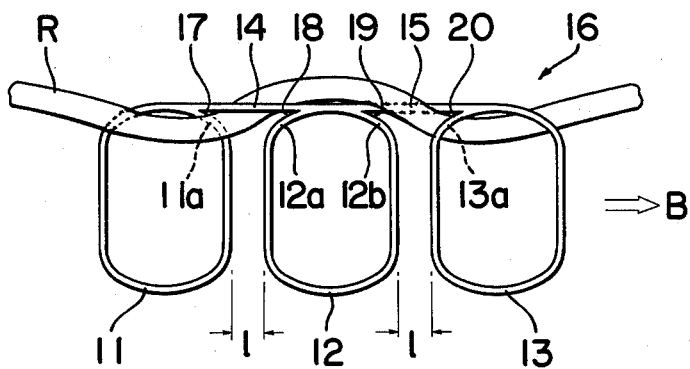
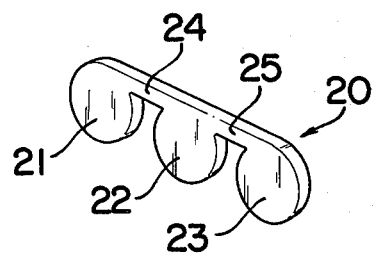
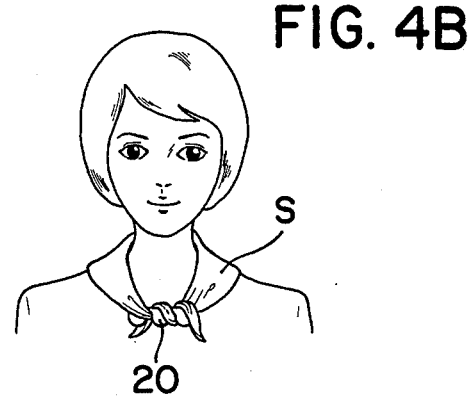
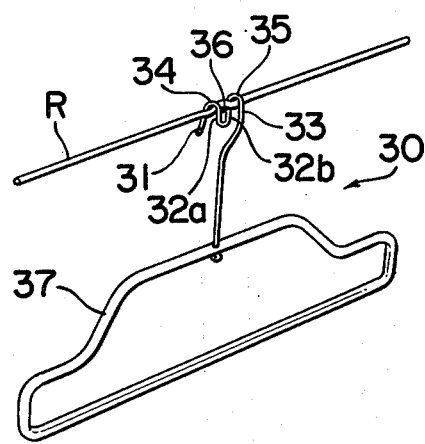
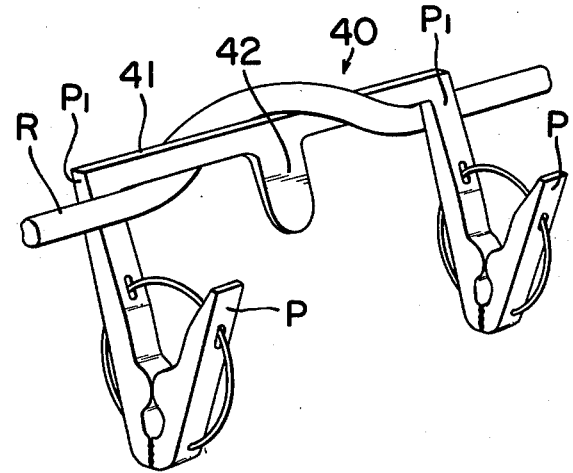

FIXTURE FOR AN ELONGATED FLEXIBLE MEMBER

BACKGROUND OF THE INVENTION

1. Field of the Invention

This invention relates to a fixture which can be immovably attached to a string, a cord, a band, a belt or the like.

2. Brief Description of the Prior Art

Various fixtures have been known which are adapted to secure sheets, cloths or the like to strings or bands. For example, a clothespin is usually used to secure washings to a rope on which the washings are hung. The washing C can be secured to the rope R by means of the clothespin P in such a way that the clothespin P holds only the washing C hung on the rope R, as shown in FIG. 1A, or the clothespin P can hold the washing C together with the rope R on which the washing is hung, as shown in FIG. 1B.

The washing C can thus be secured to the rope R by the friction force between the peripheral surface of the rope R and the backside surface of the washing C as well as the radial force of the rope R, corresponding to the sum of the weight of the washing C and the fastening force of the clothespin P in the case of FIG. 1A, or as well as the radial force of the rope R, corresponding to the sum of the weight of the washing C and the gripping force of the clothespin P in the case of FIG. 1B.

Therefore, the washing C can be held on the rope R in its axial direction perpendicular to the radial direction of the rope R only by the friction force between the peripheral surface of the rope R and the inner surface of the washing C. This results in an increase in the possibility of an unexpected axial displacement of the washing C on the rope R due to an axial external force, such as wind pressure.

In order to overcome this disadvantage, many kinds of fixtures have been proposed, but they are all inoperative or costly.

SUMMARY OF THE INVENTION

A primary object of the present invention is to eliminate the above mentioned disadvantages. This object can be achieved by providing a fixture which comprises at least two spaced vertical fixing portions and a horizontal connecting portion extending between the vertical fixing portions, and which is adapted to hold immovably washings, hangers, dresses or the like on a rope, string or band which is helically wound round the horizontal connecting portion of the fixture, even when an external force is applied to the rope, string or band in its axial or radial direction. The fixture, according to the present invention, can also apply to mountaineering ropes, ropes for a tent or ropes used in public works or any other works.

Another object of the present invention is to provide a useful fixture for a string, a band or the like, which can be simply and inexpensively mass-produced.

BRIEF DESCRIPTION OF THE DRAWINGS

Various other objects, features and attendant advantages of the present invention will be more fully appreciated as the same becomes better understood from the following detailed description thereof, when considered in connection with the accompanying drawings, in which like reference numerals designate like or corresponding parts, and wherein:

FIG. 3 is an elevational view of the second embodiment of the invention;

FIG. 4A is a perspective view of the third embodiment of the invention;

FIG. 4B is illustrative of the fixture of FIG. 4A, which is adapted to hold a scarf;

FIG. 5 is a perspective view of the fourth embodiment of the invention, in which a fixture is adapted to hold a hanger; and FIG. 6 is a perspective view of the fifth embodiment of the present invention, in which a fixture is formed integrally with clothespins.

DETAILED DESCRIPTION OF THE ILLUSTRATED EMBODIMENTS

Figure 1A:
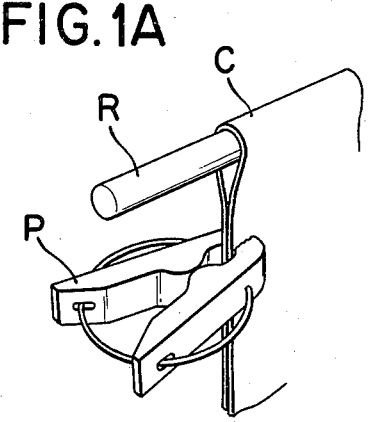
FIGS. 1A and 1B are perspective views of a known fixture for a washing which is secured to a rope in different ways.
Figure 1B:
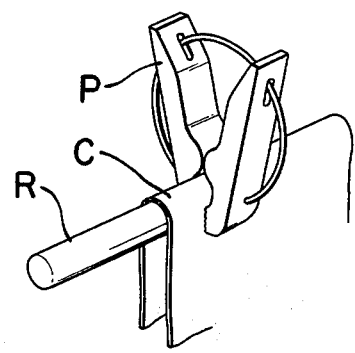

Referring now to FIGS. 2A to 2D, the fixture 4 comprises two parallel vertical fixing portions 1 and 2, in the form of rods, which are spaced from one another by a length L. The numeral 3 designates a horizontal integrally connecting portion, in the form of a rod, which extends between the fixing portions 1 and 2 and perpendicular thereto. The length L is such that a rope R can be helically wound on the horizontal connecting portion 3. The length L required depends on the material and the diameter of the rope R. It should be noted that an increase of the length L decreases the fixing effect. The fixture 4 may be made of a metal, synthetic resin, wood and the like.

When an external force, shown by arrow A, is exerted on the fixture 4 in the axial direction of the horizontal portion 3 on which the rope R is coiled by one turn and is tensed with a predetermined force, the pressure force (not shown) of the side face 1a of the fixing portion 1 only is applied to the side face of the rope R. Further, since the rope R is tensed by a predetermined force, the axis of the rope R extends at an angle $\theta$, not equal to zero, with respect to the axis of the horizontal portion 3 and, accordingly, the pressure force mentioned above effectively acts on the rope R.

Consequently, the rope R exerts a reaction force to the fixture 4 in the opposite direction to the direction A of the external force. Since the reaction force is balanced with the external force, no force sufficient to move the fixture 4 acts on the fixture 4. As a result of this balance, the fixture 4 can be immovably held on the rope R, even under the influence of a large external force.

It will be easily understood that when an external force in a direction opposite to the arrow A is applied to the fixture 4, a reaction force of the rope R acts on the side face 2a of the fixing portion 2 so that the fixture 4 can be immovably held.

Furthermore, when an external force in directions other than a direction of the axis of the horizontal portion 3 acts on the fixture 4, a portion of the side faces of the horizontal portion 3 always comes in contact with the side face of the rope R, since the rope R is helically wound on the horizontal portion 3 and, accordingly, a reaction force equivalent to the external force in a direction opposite to the direction of the external force acts on the fixture at the contact portion and is balanced with the external force, so that the fixture 4 is immovably held on the rope R. The rope R is easily loosened to move the fixture relative to the rope R. In order to increase the immovability of the fixture, the rope R may be coiled by two turns on the horizontal portion 3 to increase the angle $\theta$.

Figure 2A:
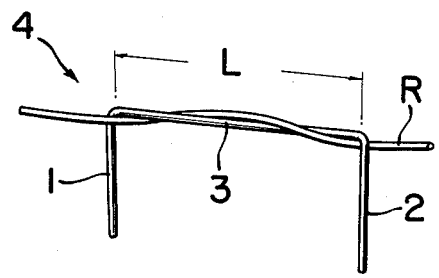
FIGS. 2A and 2B are an elevational view and a plan view of a first embodiment of the invention, respectively.
Figure 2B:
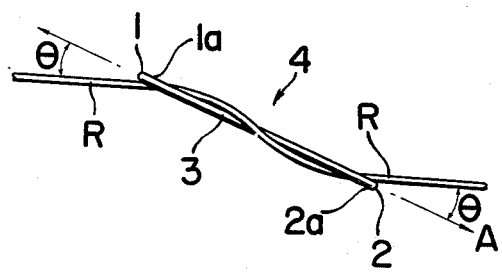
Figure 2C:
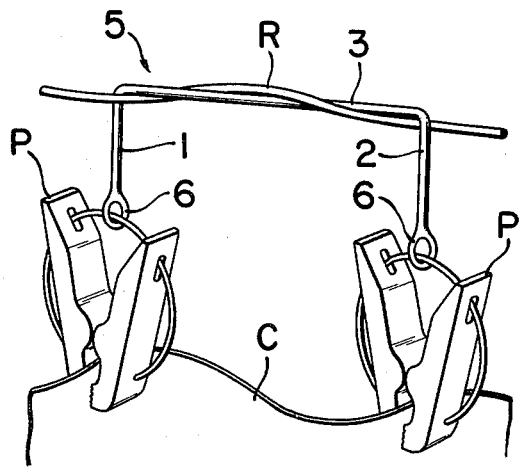
FIG. 2C is an elevational view of a fixture which is connected to clothespins.

FIG. 2C shows a fixture assembly 5 comprising the fixture as mentioned above and conventional clothespins P which are connected to rings 6 provided on the lower ends of the vertical portions 1 and 2, respectively. When the washing C is held by the clothespins P of the fixture assembly 5, the washing C can be hung from the clothespins while being maintained in its initial spread position and can be thus dried in the sun, since the fixture assembly 5 can be immovably held on the rope R, even under the influence of a strong wind.

Figure 2D:
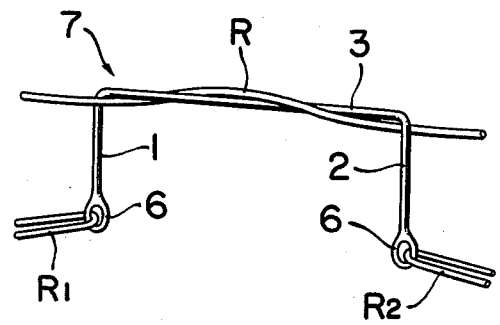
FIG. 2D is an elevational view of a fixture which is connected to stretching ropes.

FIG. 2D shows a fixture assembly 7 adapted to stretch ropes $R_1$ and $R_2$. The ropes $R_1$ and $R_2$ are inserted in and connected to rings 6 provided at the lower ends of the vertical portions 1 and 2, respectively. According to this fixture assembly 7, the ropes R, $R_1$ and $R_2$ can be stretched in their predetermined directions. Therefore, the fixture assembly 7 can also be applied to stretch ropes, in public works or in athletic meetings.

The form and the number of the elements 1, 2 and 3 are not limited to those of the fixtures shown in FIG. 2.

For example, as shown in FIG. 3, the fixture assembly 16 can have three vertical fixing portions 11, 12 and 13 in the form of generally rectangular rings. The rings 11, 12 and 13 are made of a metal string, such as a wire, and are interconnected to the horizontal connecting portions 14 and 15 of a wire. The rings 11, 12 and 13 are spaced by the length 1 from one another in one plane, the length 1 being generally equal to an outer diameter of the rope. Between each of the upper curved portions 11a, 12a, 12b and 13a of the rings 11, 12 and 13, and each of the connecting rods 14 and 15, are provided with notch portions 17, 18, 19 and 20, respectively, the width of which progressively decreases.

The fixture assembly 16 is attached to the rope R in such a way that the ring 11 or 13 is manually held and the rope R is passed through the space between the rings 11 and 12 or 12 and 13 and coiled round the connecting portions 14 and 15, as shown in FIG. 3.

When an external force acts on the fixture assembly 16 in the direction B parallel to an axis of the connecting portion 14 or 15, the force from the curved portions 11a and 12b of the rings 11 and 12, respectively, (particularly from the curved portion 11a) acts on the side face of the rope R and, accordingly, a reaction force of the rope R equivalent to the first mentioned force acts on the fixture assembly 16, so that the fixture assembly 16 can be immovably held at its initial position. Further, since the rope R is pressed in the notch portions 17 and 19 (particularly notch portion 17) by the external force in the direction of the arrow B, the fixture assembly 16 can be more rigidly held on the rope R by the pressure force, as well as by the action and reaction, as mentioned above.

When an external force in a direction opposite to the arrow B is exerted on the fixture assembly 16, the reaction force of the side face of the rope R acts on the curved portions 12a and 13a (particularly curved portion 13a) and the rope R is pressed into the clip portions 18 and 20 (particularly the clip portion 20), so that the fixture assembly 16 can be more rigidly held on the rope R.

It is also possible to connect the clothespins to the rings 11, 12 and 13 or to insert and connect another rope in and to the rings 11, 12 and 13 to function the assembly similarly to the above mentioned embodiment.

The rings may also be of circular, triangular or any other shape. Further, the rings may not be arranged in one plane in order to obtain the same effect as that of the rings arranged in one plane and, accordingly, the rings can be projected in various directions in accordance with operations of the assembly.

FIG. 4A shows a fixture 20 in the form of a plate made of wood. The fixture 20 consists of three fixing disc plates 21, 22 and 23 and two connecting plates 24 and 25 which interconnect the disc plates 21, 22 and 23. It is possible to figure or pattern the plates in order to increase the aesthetic appearance of the fixture 20.

FIG. 4B shows the fixture 20 being used for a woman's scarf, in place of a safety pin. That is, the folded ends of the scarf S are helically wound on the connecting plates 24 and 25 so that the scarf S can be immovably held by the fixture 20. Therefore, the fixture 20 shown in FIG. 4A can be designed so as to suit a user's state, and can be easily operated. Not using a safety pin ensures that no damage will occur to clothes or to the skin. Moreover, the fixture 20 is taken on or off more easily than a safety pin.

FIG. 5 shows a fixture 30 from which a hanger is hung. The fixture 30 comprises vertical fixing portions 31, 32a, 32b and 33, and horizontal connecting portions 34 and 35. These vertical portions and horizontal portions are preferably made of a single wire. Between the upper portions of the vertical fixing portions 32a and 32b is provided a gap which forms a clip portion 36. To the lower end of the fixture 30 is attached a center of an upper portion of a hanger body 37. The rope R is wound on the horizontal connecting portion 34, passes through the clip portion 36, and is then wound on the horizontal connecting portion 35, so that the fixture 30 can be immovably held by the rope R, even under the influence of a considerable external force. The hanger, which is directly hung from the rope, would undesirably move under the influence of a wind or any other external force. According to the embodiment shown in FIG. 5, however, since the rope R is pressed into the clip portion 36 and elastically held between the vertical portions 32a and 32b, the immovability of the fixture 30 and, accordingly, of the hanger body 37 with respect to the rope R increases.

Finally, FIG. 6 shows a fixture 40 having clothespins P integral therewith. In FIG. 6, vertical fixing portions P1 interconnected by means of a horizontal connecting portion 41 of the fixture 40 serve as operation members of the clothespins P. The numeral 42 designates another vertical fixing portion which projects from the center portion of the connecting portion 41. The rope R is wound on the connecting portion 41 so that the fixture can be immovably held by the rope R.

As is apparent from the above discussion, according to the present invention, the fixture comprises a horizontal connecting portion and at least two vertical fixing portions provided on the connecting portion. Therefore, when external forces act on the fixture in various directions, reaction forces to the external forces act on the fixture, so that the external forces are balanced by the reaction forces. Thus, the fixture can be immovably held on the rope even under the influence of considerable external forces. Therefore, the fixture, according to the invention, can be used in various operations, for example, when clothespins or hangers are immovably held on a rope, when a camping tent is constructed with the help of a rope or ropes, or when ropes are stretched between two portions in athletic meetings, in mountain climbings, and in shipbuilding operations or the like. Further, since the fixture according to the invention has a simple construction, the fixture can be easily operated and can be inexpensively mass-produced.

Obviously many modifications and variations of the present invention are possible in light of these teachings. It is therefore to be understood that within the scope of the appended claims the invention can be practiced otherwise than as specifically described herein.

What is claimed as new and desired to be secured by Letters Patent of the United States is:

1. An apparatus for securing one or more objects comprising at least two spaced rigid identical parallel fixing portions to which said objects may be secured;
   a linear connection portion perpendicularly connecting two of said at least two fixing portions, said fixing portions and connecting portion all lying within a single plane;
   a single elongated flexible member having two ends, said elongated flexible member being helically wound near a mid portion thereof around said linear connecting portion by an angle of at least 360 degrees, said ends being fixed so as to provide said elongated flexible member with tension;
   whereby an external force acting on said parallel fixing portions will create a reaction force along the area of contact between said elongated flexible member and said linear connecting portion so as to maintain said linear connecting portion's position with respect to said elongated flexible member; and
   each parallel fixing portion possessing a progressively decreasing width in the direction towards said linear connecting portion adjacent said connecting portion to form a notch into which said elongated flexible member becomes wedged;
   whereby an external force acting on said parallel fixing portions will cause said elongated flexible member to become wedged between said linear connecting portion and said parallel fixing portions at each point where the helix intersects the intersection of said linear connecting portion and said parallel fixing portions.

2. A fixture as set forth in claim 1, wherein each of said parallel fixing portions is in the form of a generally rectangular shaped ring through which the material may pass.

3. A fixture as set forth in claim 1, wherein each of said parallel fixing portions is in the form of a generally disc shaped plate.

4. An apparatus as set forth in claim 1 wherein said elongated flexible member is a rope.

* * * * *